United States Patent [19]

Asahi et al.

[11] Patent Number: 4,486,668
[45] Date of Patent: Dec. 4, 1984

[54] ALTERNATOR WITH VACUUM PUMP

[75] Inventors: Taro Asahi, Chiryu; Toshimitu Higashino, Oubu; Noboru Ikoma, Okazaki; Masato Hanai, Atsumi; Nakato Murata, Nagoya, all of Japan

[73] Assignee: Nippondenso Co., Ltd., Kariya, Japan

[21] Appl. No.: 515,271

[22] Filed: Jul. 19, 1983

[30] Foreign Application Priority Data

Sep. 3, 1982 [JP] Japan .................. 57-153430

[51] Int. Cl.³ .................. F01N 3/30; H02K 9/06
[52] U.S. Cl. .................. 290/1 B; 60/307; 123/198 C; 310/62
[58] Field of Search .................. 290/1 R, 1 B, 1 C; 310/59, 62, 63; 60/307; 123/179 D, 198 C

[56] References Cited

U.S. PATENT DOCUMENTS

| | | | |
|---|---|---|---|
| 1,262,691 | 4/1918 | O'Neill | 123/179 D |
| 1,608,286 | 11/1926 | Andrews et al. | 290/1 B |
| 3,628,328 | 12/1971 | Matsuzawa | |

FOREIGN PATENT DOCUMENTS 114510 10/1978 Japan .

*Primary Examiner*—J. V. Truhe
*Assistant Examiner*—Shelley Wade
*Attorney, Agent, or Firm*—Cushman, Darby & Cushman

[57] ABSTRACT

A vacuum pump is attached to a front side of an alternator, that is, between a driven pulley and the alternator, wherein a pump shaft is detachably coupled to an alternator shaft through a tubular bushing shaft. A seal member is disposed in the tubular bushing shaft for preventing leakage of lubricating oil from the pump to brushes arranged at a rear side of the alternator.

3 Claims, 2 Drawing Figures

ALTERNATOR WITH VACUUM PUMP

FIELD OF THE INVENTION

The present invention relates to an alternator with a vacuum pump and more particularly to an alternator for an internal combustion engine wherein an alternator shaft is coaxially aligned with a pump shaft of a vacuum pump.

BACKGROUND OF THE INVENTION

In a conventional alternator with a vacuum pump, for example, as disclosed in U.S. Pat. No. 3,628,328, the vacuum pump is generally attached to a rear side of the alternator, that is a side opposite to a front side where a driven pulley is provided.

In the conventional alternator of this type, however, an alternator shaft and other associating parts must be designed larger since a driving force for the vacuum pump is transmitted through a power transmission mechanism of the alternator. For example, in an alternator driven by a belt, a diameter of an alternator shaft must be designed larger since a torque applied to the alternator shaft is increased, and furthermore a larger bearing for the alternator shaft must be employed since a radial load applied to the bearing is increased in accordance with the increase of the belt tension.

In the conventional alternator of the above type, brushes for supplying electrical power to the rotor are also arranged at the rear side of the alternator, which may cause such a problem that the brushes are tainted and worn away when the lubricating oil leaks out of the pump chamber.

Furthermore, it is disadvantageous in the prior art alternator with a vacuum pump in that when a volume or a size of the vacuum pump should be changed, specifications of the alternator must be accordingly modified.

SUMMARY OF THE INVENTION

With a view of overcoming the above-described drawbacks, it is an object of the present invention to provide an alternator with a vacuum pump, wherein the specifications for the alternator may not be changed in accordance with modifications of the volume and/or size of the vacuum pump.

It is another object of the present invention to provide an alternator with a vacuum pump, wherein leakage of lubricating oil from the vacuum pump to brushes is prevented to avoid abrasion of the brushes.

The above objects are accomplished according to the present invention in such a manner that a vacuum pump is attached to a front side of an alternator and a pump shaft and an alternator shaft are detachably coupled with each other by means of a coupling such as splines.

The other objects and features of the present invention will become more apparent from the following description in conjunction with the attached drawings.

DETAILED DESCRIPTION OF PREFERRED EMBODIMENT

Figure 1:
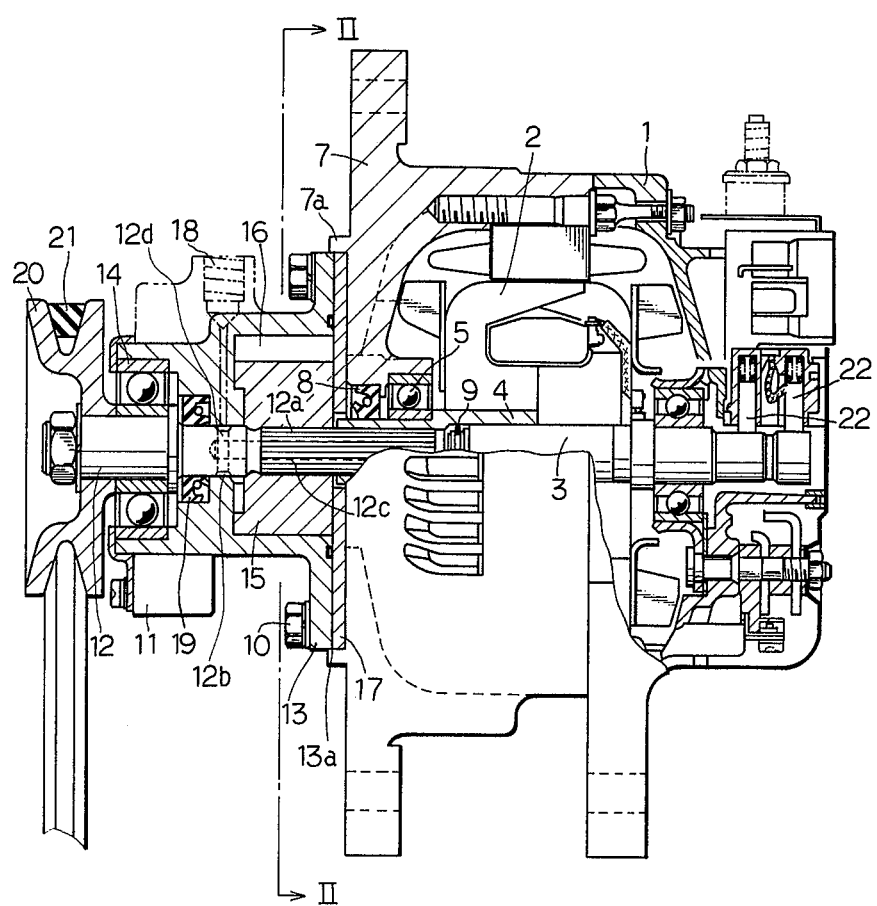
FIG. 1 shows a partial sectional view of an alternator with a vacuum pump according to the present invention.
Figure 2:
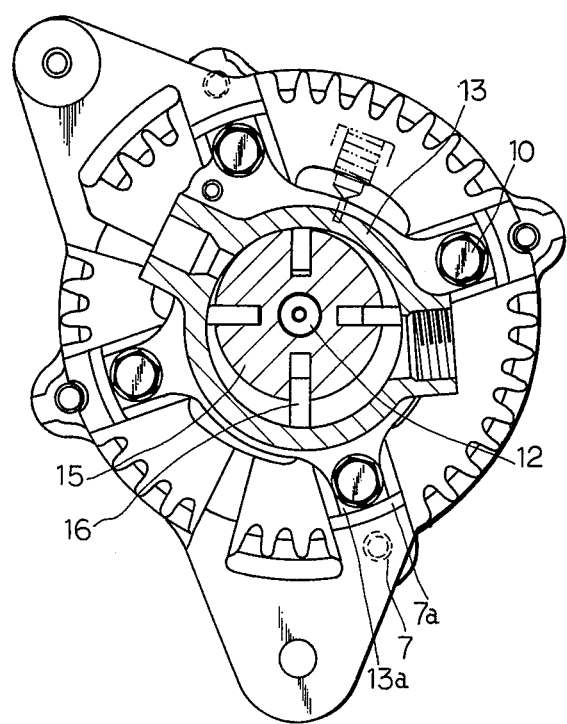
FIG. 2 shows a sectional view taken along a line II—II in FIG. 1.

Referring now to FIGS. 1 and 2, numeral 11 designates a vacuum pump arranged between an alternator 1 and a driven pulley 20, which is driven by an engine (not shown) through a V-belt 21. A casing (pump housing) 13 of the vacuum pump 11 is attached to a frame (alternator housing) 7 of the alternator 1 by means of a faucet joint at portions 7a and 13a, so that a rotating center of the vacuum pump 11 can be aligned with a rotating center of the alternator 1. A plate 17 is interposed between the frame 7 of the alternator 1 and the casing 13 of the vacuum pump 11 and the plate 17 as well as the casing 13 is secured to the frame 7 by means of bolts 10.

A rotating shaft (pump shaft) 12 of the pump 11 is rotatably supported by a bearing 14 attached to the pump casing 13 at a portion adjacent to the pulley 20, which is fixed to one end of the shaft 12. The shaft 12 extends through the pump casing 13 and its other end protrudes to an inside of the alternator 1. On the right-hand half of the shaft 12, there are formed outer straight splines 12a onto which a pump rotor 15 of the vacuum pump 11 is press-fitted, so that the rotor 15 is driven by the shaft 12 in a pump chamber defined by the casing 13 and the plate 17. The splined shaft 12 extends into the inside of the alternator and is detachably coupled to a rotor 2 through a tubular bushing shaft 4 as described hereinafter.

The rotor 2 is supported at its rotating center of the bushing shaft 4 and an alternator shaft 3 respectively carried by bearings 5 and 6 attached to the alternator frame 7. One end of the bushing shaft 4 is firmly connected to one end of the alternator shaft 3 by a known manner, for example a shrinkage fit, while the other end of the bushing shaft 4 is formed with inner splines at its inner surface to be engaged with the outer splines 12a of the pump shaft 12 so that rotating force is transmitted from the pump shaft 12 to the alternator shaft 3. Numeral 9 designates an O-ring attached to the one end of the alternator shaft 3 for sealing between the inner surface of the bushing shaft 4 and the outer surface of the alternator shaft 3 for preventing leakage of lubricating oil.

An annular groove 12b is formed on the rotating shaft 12 and supplied with lubricating oil from a port 18 formed in the pump casing 13. A bore 12c is formed in the shaft 12 and communicated at one end with the annular groove 12b through ports 12d. The bore 12c extends in the shaft 12 and terminates in an open end at its other end. The lubricating oil flows into the bore 12c through the ports 12d and flows out from the open end. The oil flows then along the splines on the shaft 12 and the bushing shaft 4 to lubricate the engaging portions thereof. The oil is finally supplied into the pump chamber to lubricate every slide portion of the pump, such as a portion between the side surfaces of the rotor 15 and the casing 13 or the plate 17, a portion between ends of sliding vanes 16 and the casing 13 or the plate 17, etc.

Numerals 8 and 19 designate seal members arranged at both sides of the pump chamber to prevent the lubricating oil from flowing out of the pump chamber.

Numeral 22 designates brushes arranged at a rear side of the alternator for supplying electric current to the rotor 2.

Next, each load on the respective portions for transmitting the torque is explained.

A torque required to be transmitted from the belt 21 to the pulley 20 is the sum of a torque for driving the alternator and a torque for driving the vacuum pump. Provided that the rotational speed of the pulley is constant, the tension of the belt is determined by the sum of the torques for driving the alternator and the vacuum pump. The tension of the belt gives to the pulley a radial pressure in a direction at right angle to an axis of the shaft and a torque around its axis. This radial pressure is mostly absorbed by the bearing 14. The torque transmitted by the shaft 12 is the sum of the torques for driving the alternator and the vacuum pump, while the torque transmitted by the shaft 3 is the torque for driving the alternator.

The influences with respect to mechanical strength caused by attaching the vacuum pump to the alternator appear on not the shaft 3 but bearing 14 and the shaft 12. This is very important for the alternator as one of main automotive electrical equipments in view of standardization of the same.

It is understood from the above disclosure that the present invention has the following advantages:

(a) It is quite easy to combine many kinds of vacuum pumps with the alternator without causing any modifications for the alternator.

(b) The heat generated in the vacuum pump may be hardly transmitted to the alternator since the pump shaft and the alternator shaft are constructed as separate elements.

(c) The lubricating oil is prevented from being leaked from the vacuum pump to the brushes.

The present invention is explained with respect to one of the embodiments, however many modifications are possible without departing from the spirit and scope of the invention defined in the appended claims.

For example, the pump shaft and the alternator shaft may be coupled with each other by means of a key and key ways.

Oil seal members 8 and 19 may be disposed outsides of the bearings 5 and 14 so that the bearings can be lubricated by the oil from the vacuum pump.

What is claimed is:

1. An alternator with a vacuum pump comprising:
   an alternator housing;
   a rotor rotatably disposed in said alternator housing;
   an alternator shaft supporting said rotor and rotatably supported at its one end by a bearing;
   tubular bushing shaft firmly coupled at its one end to the other end of said alternator shaft and rotatably supported by a bearing;
   a pump housing attached to said alternator housing;
   a pump shaft rotatably supported by said pump housing and detachably coupled at its one end to the other end of said tubular bushing shaft through coupling means;
   a pump rotor supported on said pump shaft and rotatably disposed in said pump housing; and
   a driven pulley fixed to the other end of said pump shaft.

2. An alternator as claimed in claim 1,
   wherein said coupling means comprises:
   splines formed on an outersurface of said pump shaft at said one end; and
   splines formed on an innersurface of said tubular bushing shaft at said other end,
   said splines formed on said pump shaft and said tubular bushing shaft being engagable with each other.

3. An alternator as claimed in claim 1,
   further comprising:
   a seal member disposed in said tubular bushing shaft for preventing leakage of lubricating oil.

* * * * *